United States Patent [19]

Rippetoe et al.

[11] Patent Number: 5,538,081
[45] Date of Patent: Jul. 23, 1996

[54] METHOD OF INCREASING THE AMOUNT OF HYDROCARBONS FROM AN UNDEGROUND RESERVOIR

[75] Inventors: William W. Rippetoe, Bixby; David N. Shroff, Broken Arrow, both of Okla.

[73] Assignee: Universal Environmental Technologies, Inc., Naples, Fla.

[21] Appl. No.: 498,086

[22] Filed: Jul. 5, 1995

[51] Int. Cl.$^6$ ............................ E21B 43/25; E21B 43/267
[52] U.S. Cl. .............................. 166/279.000; 166/280; 166/308
[58] Field of Search ...................... 166/279, 280, 166/308, 305.1, 363, 260, 271, 259, 371, 51, 278

[56] References Cited

U.S. PATENT DOCUMENTS

| | | | |
|---|---|---|---|
| 2,888,988 | 6/1959 | Clark | 166/280 |
| 3,127,935 | 4/1964 | Poettmann et al. | 166/260 |
| 3,980,565 | 9/1976 | Fowler | 210/489 |
| 4,306,981 | 12/1981 | Blair, Jr. | 166/303 |

*Primary Examiner*—Stephen J. Novosad
*Attorney, Agent, or Firm*—Merrill N. Johnson

[57] ABSTRACT

A method of increasing the amount of hydrocarbons that are recoverable from an underground reservoir into which an oil well has been drilled. The method includes first pumping a quantity of negatively charged water down the oil well and into the underground reservoir. Then a quantity of particles of a copper-nickel-zinc alloy are pumped down the oil well and into the underground oil reservoir. Optionally the alloy is followed by a quantity of frac sand pumped down the well and into the reservoir and followed by a sufficient volume of negatively charged water to flush the frac sand out of the well casing and wellbore and into the reservoir. The well is then shut-in to stabilize the particles of alloy and frac sand, if added, within the reservoir. The well is then reopened, allowing the water and gases formerly entrained within the reservoir to be expelled from the reservoir and the well, thereby leaving the alloy particles and frac sand, if used, within the reservoir to provide a path for the continuing flow or hydrocarbons to the wellbore.

5 Claims, 2 Drawing Sheets

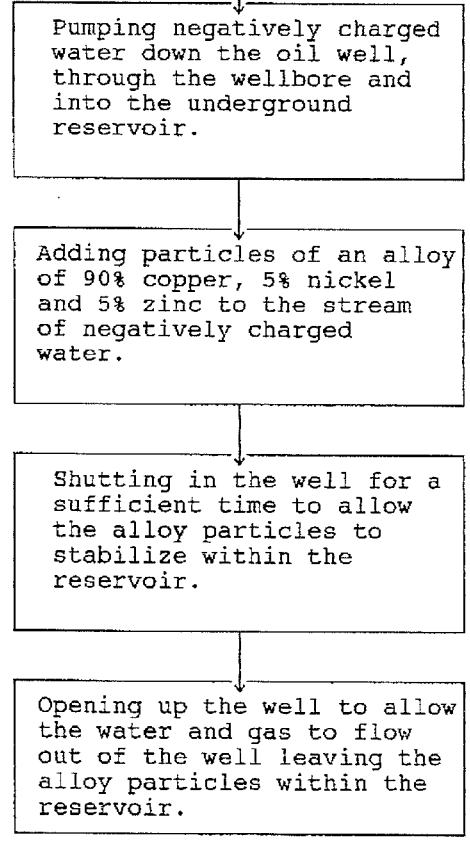

METHOD OF INCREASING THE AMOUNT OF HYDROCARBONS FROM AN UNDERGROUND RESERVOIR

Pumping negatively charged water down the oil well, through the wellbore and into the underground reservoir.

Adding particles of an alloy of 90% copper, 5% nickel and 5% zinc to the stream of negatively charged water.

Shutting in the well for a sufficient time to allow the alloy particles to stabilize within the reservoir.

Opening up the well to allow the water and gas to flow out of the well leaving the alloy particles within the reservoir.

Fig. 1

```
┌─────────────────────────────────────────────┐
│  ALTERNATIVE METHOD OF INCREASING THE AMOUNT OF │
│  HYDROCARBONS FROM AN UNDERGROUND RESERVOIR │
└─────────────────────────────────────────────┘
                    │
                    ▼
┌─────────────────────────────────────────────┐
│  Pumping negatively charged water down the  │
│  oil well, through the wellbore and into    │
│  the underground reservoir.                 │
└─────────────────────────────────────────────┘
                    │
                    ▼
┌─────────────────────────────────────────────┐
│  Adding particles of alloy of 90% copper,   │
│  5% nickel and 5% zinc to the stream of     │
│  negatively charged water.                  │
└─────────────────────────────────────────────┘
                    │
                    ▼
┌─────────────────────────────────────────────┐
│  Adding frac sand to the stream of          │
│  negatively charged water until the bulk    │
│  of the frac sand is lodged within the      │
│  reservoir.                                 │
└─────────────────────────────────────────────┘
                    │
                    ▼
┌─────────────────────────────────────────────┐
│  Continuing to pump negatively charged      │
│  water until the frac sand is flushed out   │
│  of the well casing and wellbore.           │
└─────────────────────────────────────────────┘
                    │
                    ▼
┌─────────────────────────────────────────────┐
│  Opening up the well to allow the water     │
│  and gas to flow out of the well leaving    │
│  the alloy particles and frac sand within   │
│  the reservoir.                             │
└─────────────────────────────────────────────┘
```

METHOD OF INCREASING THE AMOUNT OF HYDROCARBONS FROM AN UNDEGROUND RESERVOIR

FIELD OF INVENTION

Our invention lies in the field of the recovery of crude oil and other hydrocarbons from an underground reservoir of crude oil by means of an oil well. The invention is applicable to those underground hydrocarbon reservoirs which contain undesirable crude oil-water emulsions and entrained gases and those wells having deposited scale and corrosion problems.

BACKGROUND OF THE INVENTION

When underground hydrocarbon reservoirs are produced by conventional methods, production declines as the reservoir is produced. The rate of decline of a particular reservoir depends on the geologic type of reservoir (limestone, sandstone, chalk, etc.) and the physical structure of the reservoir (its porosity, permeability, etc.). Abnormal production decline occurs when the well drilled into the reservoir experiences flow-inhibiting scale and corrosion problems or when oil-water emulsions and/or entrained gases occur in the reservoir.

Various treatments have been used to stimulate production from reservoirs experiencing the above described problems. Steam injection, hot oiling and flushing the wellbore with certain chemicals, if successful, treat only the wellbore and must be periodically repeated to maintain economically satisfactory production. When the stimulation treatments cost more than the resulting production, the well becomes uneconomic and is abandoned.

SUMMARY OF THE INVENTION

Our invention breaks up undesirable oil-water emulsions, frees entrained gases, and prevents the formation of scale and corrosion in both the hydrocarbon reservoir, the wellbore and the production equipment and thereby increasing the recoverable hydrocarbons in the reservoir.

Although our invention was first used and proven on several abandoned oil wells in Southeastern Kansas, the invention can be used effectively on abandoned wells, on existing flowing and pumped wells, and on newly drilled wells to enhance the flow of crude oil from the reservoir.

Based upon experience gained in the recovery of crude oil and natural gas from several abandoned oil wells in Southeastern Kansas, we have found that to obtain a significant increase in the productivity of a hydrocarbon reservoir, a succession of specific ingredients must be pumped down the well drilled into the reservoir and injected under pressure into the reservoir.

The first ingredient is negatively charged water, preferably water which has been treated, that is, pumped through, a device which we have invented and named the Ion Collider™ which alters some of the physical characteristics of its treated liquids. Ion Collider treated water has a number of altered characteristics including the fact that it is negatively charged.

When sufficient negatively charged water has been pumped to establish a pump rate, particles of a unique metal alloy about the size of coarse silicon sand particles are injected into the stream of preferably Ion Collider treated water and the water flow rate maintained sufficiently high to deposit the metal alloy particles throughout the reservoir. The alloy is preferably 90% copper, 5% nickel and 5% zinc. Other chemicals may or may not be added to the stream of water to reduce friction pressure and help carry the alloy particles in the fluid stream.

As the particles of alloy are pumped out of the well and into the reservoir, they react with the reservoir rock, freeing entrained gases and breaking up oil-water emulsions encountered along the pumped path of the alloy particles.

When the alloy particles have permeated the reservoir, frac sand may be added to the stream of pumped Ion Collider treated water in order to prop-up and hold the formation open providing a path of least resistance for fluid flow from the reservoir, thereby insuring a continuous flow of hydrocarbons to the wellbore. The volume of frac sand, if any is used, depends upon the reservoir size and its characteristics and its history of prior reservoir stimulation.

If frac sand is utilized, as soon as the predetermined volume of frac sand has penetrated the reservoir, a sufficient volume of negatively charged water is pumped in to flush all the frac sand out of the well casing and away from the wellbore.

Regardless of whether frac sand is used, the well is then shut-in to allow the alloy particles and any frac sand to settle and stabilize in their positions within the reservoir. The shut-in period varies with the particular reservoir being treated and lasts from as little as thirty minutes to a maximum of twenty four hours.

Then when the well is opened up, depending on the bottom hole pressure, the negatively charged water will flow out of the reservoir and almost all the treated water will be recovered, but leaving the alloy particles and the frac sand, if used, to remain within the reservoir to assure its porosity and permeability and the flow of hydrocarbons to the wellbore.

During recovery of the treated water, entrained gas from within the reservoir will be released, thus assisting the flow of hydrocarbons. The wells in Southwestern Kansas on which our invention was first proven had been abandoned for from 10 to 40 years. The recovery of hydrocarbons from these wells was extremely profitable since the continuing production from these wells paid the entire cost of our treatment in from two days to three weeks production per well.

BRIEF DESCRIPTION OF THE DRAWINGS

FIG. 1 is a flow chart showing the basic steps of our process.

FIG. 2 is a flow chart showing the steps of our process when frac sand is included in the process.

DETAILED DESCRIPTION OF THE PREFERRED EMBODIMENTS

Based upon the recent use of our process in the recovery of hydrocarbons from a total of ten abandoned wells in Southwestern Kansas, FIG. 1 sets forth the basic steps of our process. However, based upon our review of the geology and history of all ten abandoned wells, on several wells we decided to add frac sand and FIG. 2 sets forth the steps used in treating these wells.

The ten abandoned wells treated with our process are located near Urbana, Kansas, under lease to Design Tech of Kansas Inc. Treatment of the wells took place in January and February of 1995 under an agreement between applicants and Design Tech.

The well known as Heilman #11 originally drilled in 1978 is an example of those wells treated pursuant to the process shown in FIG. 1. Heilman #11 was abandoned in the early 1980s. In preparation for our process, the well was reperforated at from 535 to 543 feet in February of 1995.

Heilman #11 was treated with our process on Feb. 18, 1995. All of the water used in the process was first pumped through our Ion Collider™ as illustrated and described in our prior pending U.S. patent application Ser. No. 08/350,849, now U.S. Pat. No. 5,482,629, and hence the water was negatively charged. Although our Ion Collider is very effective in negatively charging water, other means of producing the negatively charged water may be used.

Ion Collider treated water was pumped down the well casing, through the wellbore and into the formation at 1200 p.s.i. The formation pressure then broke to 500 p.s.i. at which point we added 50 pounds of our copper-nickel-zinc alloy particles to the stream of negatively charged water until all the alloy particles had been flushed out of the casing and into the reservoir. A total of 40 barrels of negatively charged water was pumped down the well. The well was then shut-in for two hours with a shut-in pressure of 200 p.s.i. at the surface of the well.

A workover rig was then used to swab the well casing and a total of 15 barrels of water was recovered in two hours. The well was then shut-in overnight. The next morning the liquid level was 150 feet below the surface. The swab line was again lowered into the casing and on the first pull, the well unloaded and began flowing oil up the casing. Twenty barrels of oil and all of the remaining water was recovered within ten hours. Heilman #11 was then put on pump and began producing 12 barrels of oil, water and gas per day.

The well known as Heilman #7 originally drilled in 1981 is an example of those wells whose treatment included the use of frac sand pursuant to the process set forth in FIG. 2.

Heilman #7 was treated on Feb. 25, 1995. A total of 230 barrels of Ion Collider treated water was pumped down the 2⅞ inch casing of Heilman #7 at a rate of 10 barrels per minute.

After the negatively charged water had invaded the reservoir, 50 pounds of our copper-nickel-zinc alloy particles were added to the stream of negatively charged water and then 10,000 pounds of frac sand was pumped down the well casing.

It took about 47 minutes to pump the frac sand into the well casing with pump pressures fluctuating from a maximum of about 4100 p.s.i. to a minimum of less than 100 p.s.i. and averaging about 1500 p.s.i. Thereafter additional Ion Collider treated water was pumped down the casing sufficient to flush the frac sand out of the casing and the wellbore and into the reservoir.

The well was then shut-in for 30 minutes and then opened up. When the well was reopened, the treated water and gases formerly entrained within the reservoir blew over the top of the workover rig. The owner of Design Tech and the workover crew had never seen 500 foot wells "blow out" before Heilman #7 was treated with our process and reopened.

After the water was recovered, Heilman #7 was put on pump and produced 50 barrels of hydrocarbons per day, the maximum capacity of the pump. Six weeks later the well was still producing 25 barrels of liquid and gas each day. The well continues to produce more liquid hydrocarbons than when originally completed 14 years ago plus quantities of gas.

While we have described two examples of our unique method of increasing the amount of hydrocarbons from an underground oil reservoir, such description is in no way intended to limit our method and those skilled in art will be able from the foregoing description to apply our method to other drilled and to be drilled underground hydrocarbon reservoirs. The scope and spirit of our invention is limited only by the appended claims.

We claim:

1. A method of increasing the amount of hydrocarbons recoverable from an underground reservoir into which an oil well has been drilled with a wellbore within the reservoir comprising pumping negatively charged water down the oil well casing and through the wellbore into the underground reservoir until the negatively charged water has invaded the reservoir, adding a predetermined volume of particles of a metal alloy comprising about 90% copper, 5% nickel and 5% zinc to the stream of negatively charged water being pumped into the reservoir, then shutting-in the oil well for a predetermined period of time to allow the particles of metal alloy to stabilize within the reservoir, and then opening up the well to allow the negatively charged water and the gas formerly entrained within the reservoir to flow out of the well and leaving the metal alloy particles within the reservoir to provide a path for the continuing flow of hydrocarbons to the wellbore.

2. A method of increasing the amount of hydrocarbons recoverable from an underground reservoir as set forth in claim 1 which includes adding a predetermined volume of frac sand to the stream of negatively charged water immediately following the addition of particles of metal alloy to the stream of water until the bulk of the frac sand has been lodged within the reservoir and then pumping an additional volume of negatively charged water sufficient to flush the frac sand out of the well casing and the wellbore.

3. A method of increasing the amount of hydrocarbons recoverable from an underground reservoir as set forth in claim 1 in which the water is first pumped through an Ion Collider to give the water its negative charge.

4. A method of increasing the amount of hydrocarbons recoverable from an underground reservoir as set forth in claim 1 in which the metal particles are an alloy consisting by volume of 90% copper, 5% nickel and 5% zinc.

5. A method of increasing the amount of hydrocarbons recoverable from an underground reservoir as set forth in claim 1 in which the size of the metal alloy particles is equal to the particle size of coarse silicon sand.

* * * * *